United States Patent
Ryan et al.

(10) Patent No.: US 11,688,370 B2
(45) Date of Patent: Jun. 27, 2023

(54) INSTRUMENT HANGER

(71) Applicants: Michael Ryan, Plymouth, MI (US); Dale Ryan, Plymouth, MI (US); Sylvia Ryan, Plymouth, MI (US)

(72) Inventors: Michael Ryan, Plymouth, MI (US); Dale Ryan, Plymouth, MI (US); Sylvia Ryan, Plymouth, MI (US)

(73) Assignees: Michael Ryan, Plymouth, MI (US); Dale Ryan, Plymouth, MI (US); Sylvia Ryan, Plymouth, MI (US)

( * ) Notice: Subject to any disclaimer, the term of this patent is extended or adjusted under 35 U.S.C. 154(b) by 309 days.

(21) Appl. No.: 17/089,845

(22) Filed: Nov. 5, 2020

(65) Prior Publication Data

US 2021/0049988 A1 Feb. 18, 2021

Related U.S. Application Data

(63) Continuation-in-part of application No. 16/874,506, filed on May 14, 2020, now Pat. No. 11,466,811.

(60) Provisional application No. 62/847,527, filed on May 14, 2019.

(51) Int. Cl.
G10G 5/00 (2006.01)
F16M 13/02 (2006.01)
G01K 1/02 (2021.01)
G10G 7/02 (2006.01)

(52) U.S. Cl.
CPC .............. *G10G 5/00* (2013.01); *F16M 13/02* (2013.01); *G01K 1/02* (2013.01); *G10G 7/02* (2013.01); *F16M 2200/066* (2013.01)

(58) Field of Classification Search
CPC ........ F16M 13/02; H05B 47/105; G08B 5/22; G08B 21/182; G10G 5/00; G10G 1/02
USPC ......................................................... 248/550
See application file for complete search history.

(56) References Cited

U.S. PATENT DOCUMENTS 11,466,811 B2 * 10/2022 Ryan .................... G10G 5/00
2021/0049988 A1 * 2/2021 Ryan .................... G01K 1/02

\* cited by examiner

*Primary Examiner* — Todd M Epps
(74) *Attorney, Agent, or Firm* — Dickinson Wright PLLC (57) ABSTRACT

An apparatus for hanging an instrument includes a wall plate, an axial arm, and a yoke. The wall plate is configured to secure the apparatus to a wall or other suitable surface. The axial arm extends axially between the wall plate and the yoke. The yoke is configured to receive at least a portion of an instrument. The apparatus also includes a humidistat disposed on a surface of the wall plate opposite the wall or other suitable surface. The humidistat is configured to display a relative humidity value corresponding to an amount of water vapor in the atmosphere proximate the instrument.

20 Claims, 8 Drawing Sheets

INSTRUMENT HANGER

CROSS-REFERENCES TO RELATED APPLICATIONS

This Continuation-In-Part patent application claims the benefit and priority to U.S. patent application Ser. No. 16/874,506 filed May 14, 2020, which claims priority to U.S. Provisional Patent Application Ser. No. 62/847,527 filed May 14, 2019, the entire disclosures of which are hereby incorporated by reference.

TECHNICAL FIELD

This disclosure relates to instrument hangers and, in particular, instrument hangers having humidistats disposed thereon.

BACKGROUND

Instruments, such as stringed instruments, wind instruments, brass instruments, percussive instruments, and the like, may be susceptible to changes in humidity in the environment in which the instruments are stored. For example, instruments may be stored in cases, on instrument stands, or on instrument hangers, when not in use. The environment in which such cases, instrument stands, and/or instrument hangers reside may experience changes in humidity due to changes in season or other suitable changes that affect humidity of the environment. As the humidity changes, components of the instruments may experience expansion and/or contraction, which may result in undesirable characteristics of the instruments.

SUMMARY

This disclosure relates generally to instrument hanger systems and methods.

An aspect of the disclosed embodiments is an apparatus for hanging an instrument. The apparatus includes a wall plate, an axial arm, and a yoke. The wall plate is configured to secure the apparatus to a wall or other suitable surface. The axial arm extends axially between the wall plate and the yoke. The yoke is configured to receive at least a portion of an instrument. The apparatus also includes a humidistat disposed on a surface of the wall plate opposite the wall or other suitable surface. The humidistat is configured to display a relative humidity value corresponding to an amount of water vapor in the atmosphere proximate the instrument.

Another aspect of the disclosed embodiments includes an apparatus for hanging an instrument. The apparatus includes a wall mount adapted to secure the apparatus to mountable surface and a yoke adapted engage a bore extending through the wall mount, the yoke being adapted to receive at least a portion of an instrument. The apparatus also includes an axial arm that extends from the yoke and is configured to secure the yoke to the wall mount and at least one sensor disposed on the wall mount configured to measure at least one characteristic. The apparatus also includes a controller configured to: receive at least one measurement indicating the at least one characteristic from the at least one sensor; generate at least one indication based on the at least one measurement; and display, at a digital display disposed on a surface of the wall mount opposite the mountable surface.

Another aspect of the disclosed embodiments includes a system. The system includes a processor and a memory. The memory includes instructions that, when executed by the processor, cause the processor to: receive sensor data from a sensor of an instrument hanger; determine whether to generate at least one indication based on the sensor data; in response to a determination to generate the at least one indication, generate the at least one indication based on the sensor data; and provide the at least one indication.

Another aspect of the disclosed embodiments includes a method. The method includes receiving sensor data from a sensor of an instrument hanger and determining whether to generate at least one indication based on the sensor data. The method also includes, in response to a determination to generate the at least one indication, generating the at least one indication based on the sensor data. The method also includes providing the at least one indication.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, instruments, such as stringed instruments, wind instruments, brass instruments, percussive instruments, and the like, may be susceptible to changes in humidity in the environment in which the instruments are stored. For example, instruments may be stored in cases, on instrument stands, or on instrument hangers, when not in use. The environment in which such cases, instrument stands, and/or instrument hangers reside may experience changes in humidity due to changes in season or other suitable changes that affect humidity of the environment. As the humidity changes, components of the instruments may experience expansion and/or contraction, which may result in undesirable characteristics of the instruments.

To control humidity in the environment around the instrument, humidifiers and/or dehumidifiers may be used to increase and/or decrease the amount of water vapor in the atmosphere around the instruments. In some cases, both a humidifier and a dehumidifier may be used to control the amount of water vapor on the atmosphere around the instrument. For example, the humidifier and dehumidifier cooperatively operate to maintain a desired relatively humidity by increasing an amount of water vapor in the atmosphere around the instrument when the humidity drops below a threshold and may remove water vapor from the atmosphere around the instrument when the humidity rises above a threshold.

In order to monitor the relative humidity around the instrument, a humidistat or other humidity measuring or monitoring device may be used. For the humidistat to provide an accurate measurement of the humidity around the instrument, the humidistat may need to be placed in close proximity to the instrument. Accordingly, the apparatuses described herein include instrument hangers, such as wall mounted instrument hangers, having one or more components, such as one or more light sources and/or controller.

Figure 1:
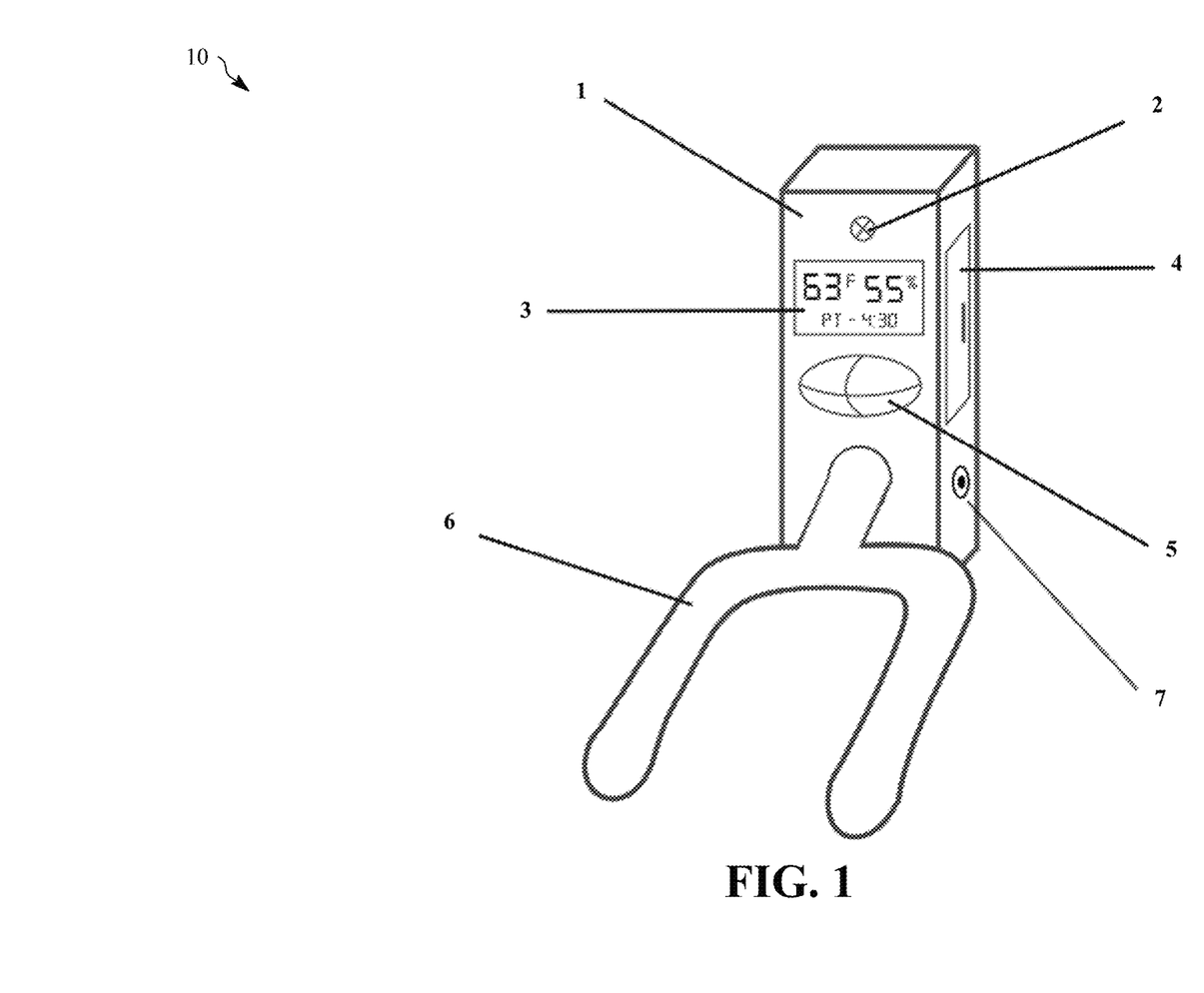
FIG. 1 generally illustrates a wall mounted instrument hanger according to the principles of the present disclosure.

FIG. 1 generally illustrates a wall mounted instrument hanger 10 according to the principles of the present disclosure. The hanger 10 includes a wall mount 1 and a screw mount 2. The wall mount 1 may include a body comprising any suitable material including a polymer material, a natural material (e.g., wood or other suitable natural material, metal material, composite material, any other suitable material, or combination thereof. The wall mount 1 may include a molded plastic injected body, or any other suitable body manufactured using any suitable technique and material.

The screw mount 2 may include a through bore extending from a first or front surface of the wall mount 1 to a second or rear surface of the wall mount 1. The screw mount 2 may include a plurality of threads or a substantially smooth surface extending along the through bore. The screw mount 2 may be configured to receive any suitable fastener and may be further configured to attached and/or secure the wall mount 1 to a wall or other suitable surface.

Figure 4:
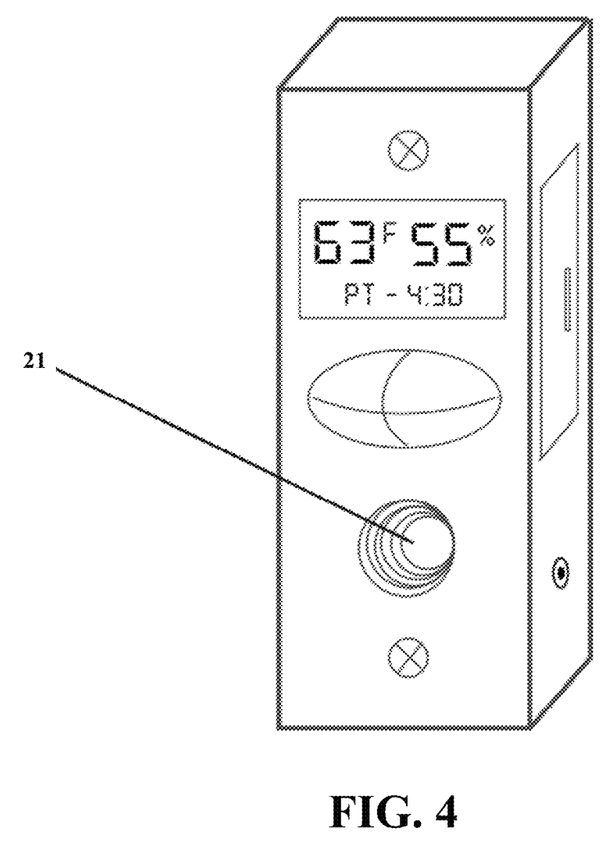
FIG. 4 generally illustrates a back plate according to the principles of the present disclosure.
Figure 5:
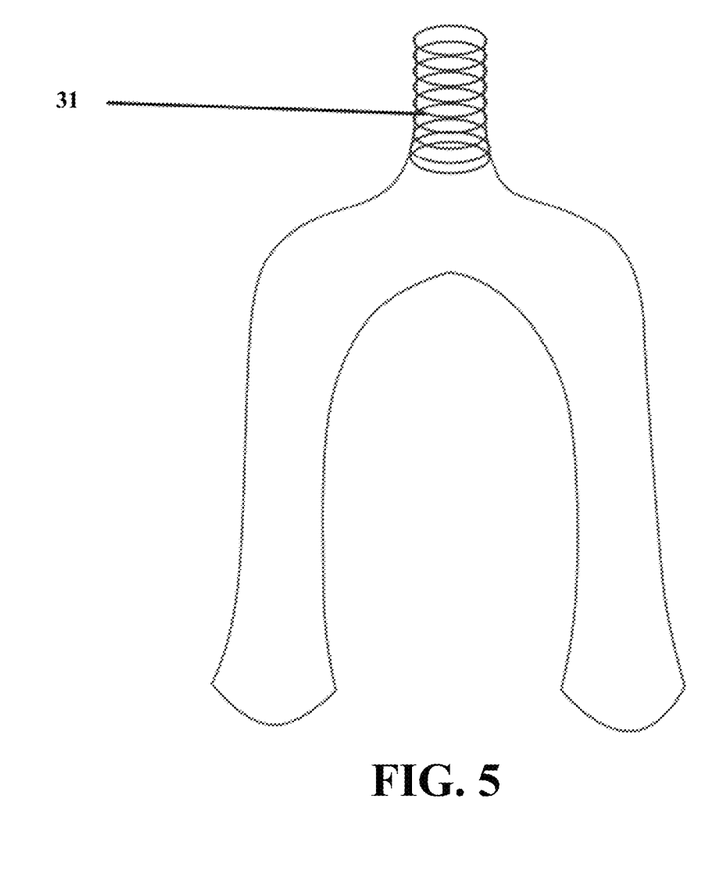
FIG. 5 generally illustrates a yoke according to the principles of the present disclosure.

The hanger 10 includes a yoke 6 configured to be attached and/or secured to the wall mount 1 in any suitable fashion. For example, as is generally illustrated in FIG. 4, the wall mount 1 may include a threaded bore 31 extended from a front surface of the wall mount 1 into the body of the wall mount 1. As is generally illustrated in FIG. 5, the yoke 6 includes a threaded portion 41 configured to be received by and/or engage with the threaded bore 31 of the wall mount 1.

Figure 2:
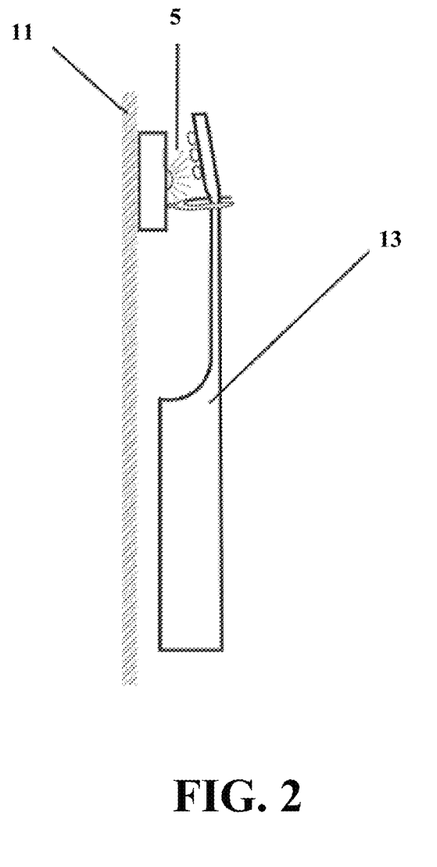
FIG. 2 generally illustrates a side view of a wall mounted instrument hanger according to the principles of the present disclosure.
Figure 3:
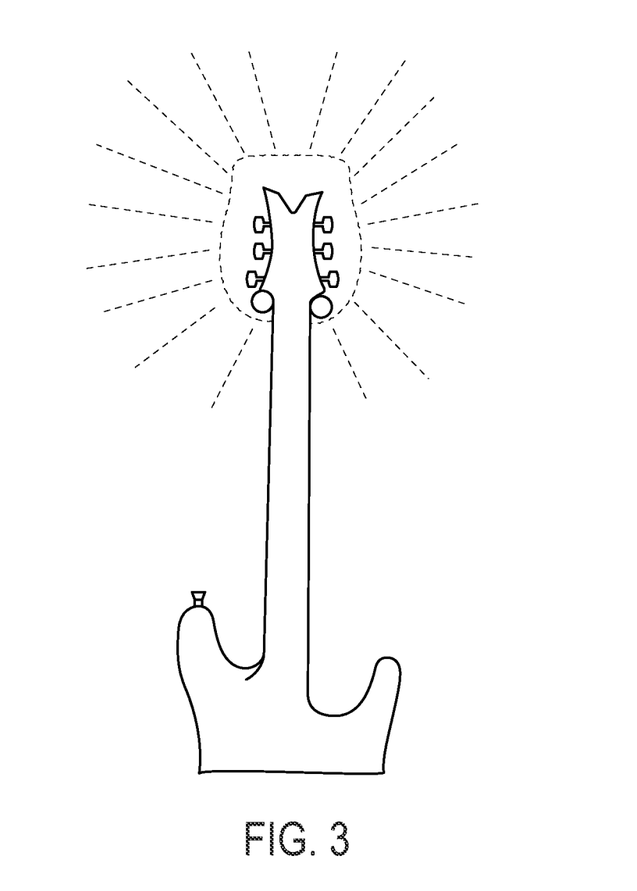
FIG. 3 generally illustrates an illuminated wall mounted instrument hanger according to the principles of the present disclosure.

The yoke 6 is configured to receive a portion of an instrument. For example, as is generally illustrated in FIG. 2 a portion of a guitar 13, such as a portion of a neck of the guitar 13, may be received by the yoke 6. While only a guitar 13 is illustrated, the yoke 6 may be configured to receive any suitable instrument, such as any suitable stringed instrument, any suitable wind instrument, any suitable brass instrument, any suitable percussive instrument, or any other suitable instrument. Additionally, or alternatively, the hanger 10 may include any suitable instrument hanger.

Figure 6:
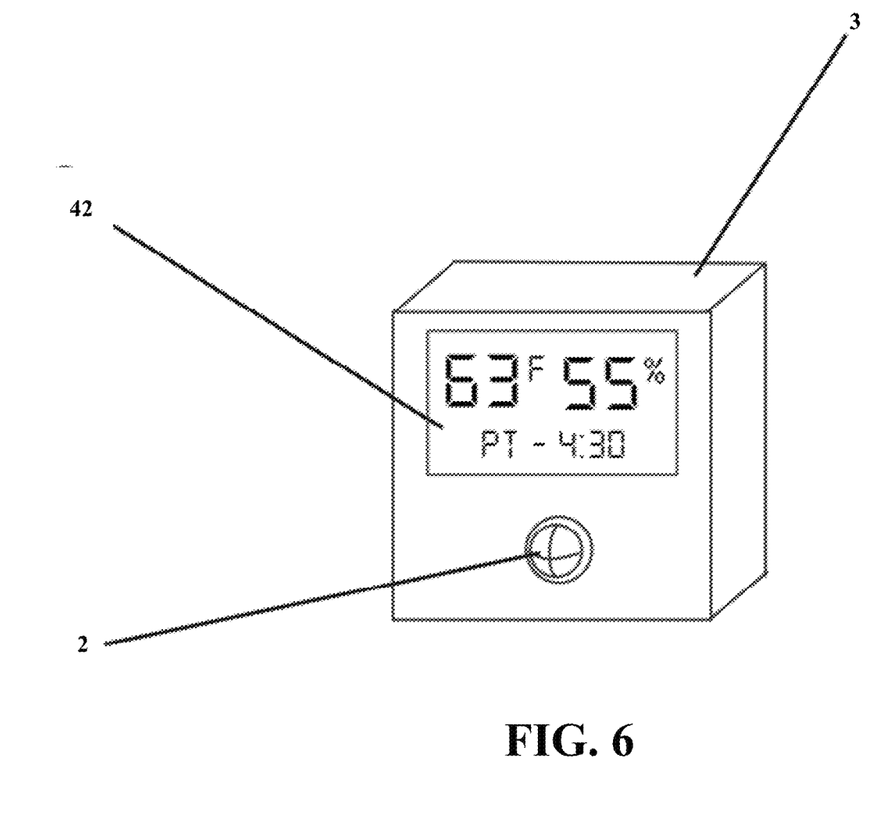
FIG. 6 generally illustrates a wall mounted instrument hanger component according to the principles of the present disclosure.

In some embodiments, the hanger 10 includes a controller 3, as is generally illustrated in FIGS. 1 and 6. The controller 3 may include a computing device that includes a processor and a memory. The processor may include any suitable processor, such as those described herein. The controller 3 may include any suitable number of processors. The memory may comprise a single disk or a plurality of disks (e.g., hard drives), and includes a storage management module that manages one or more partitions within the memory. In some embodiments, memory may include flash memory, semiconductor (solid state) memory or the like. The memory may include Random Access Memory (RAM), a Read-Only Memory (ROM), or a combination thereof. The processor being configured to execute instructions stored on the memory. For example, the processor may execute instructions stored on the memory to determine a current time, display a temperature, and/or other suitable information.

In some embodiments, the controller 3 includes one or more sensors or sensing devices. The one or more sensors may include a temperature sensor, a humidity sensor, other suitable sensors, or a combination thereof. The processor may be in communication with the one or more sensors and may receive measurements from the one or more sensors. The processor may execute instructions on the memory to analyze the measurements and generate one or more corresponding outputs. For example, the processor may determine a current temperature proximate the controller 3 and/or a current relative humidity proximate the controller.

The processor may be in communication with a digital display 42 disposed on the surface of the wall mount 1 facing away from the wall. The digital display 42 may include any suitable digital display. The processor may be configured to communicate to the digital display 42 the outputs corresponding to the measurements. For example, the processor may communicate a current temperature, a current humidity, and/or other suitable outputs. The digital display 42 is configured to display the outputs communicated from the processor.

In some embodiments, the hanger 10 includes one or more light components 5 as is generally illustrated in FIGS. 1 and 2. The light component 5 may include any suitable light component including one or more light emitting diodes, or other suitable light component. The light component 5 may be selectively adjustable. For example, the light component 5 may be dimmable and/or a color of the light component 5 may be adjustable. The light component 5 may be disposed in any suitable location. For example, the light component 5 may be disposed above the yoke 6 and below the digital display 42 on the surface of the wall mount 1 facing away from the wall.

In some embodiments, the light component 5 may be configured and positioned such that light emitting from the light component 5 is directed away from the wall mount 1 toward the yoke 6. For example, the light emitting from the light component 5 may illuminate a back portion of the guitar 13 (e.g., or any suitable instrument in the yoke 6), as is generally illustrated in FIG. 2.

In some embodiment, the light component 5 may be covered by a lens comprising plastic or other suitable material). The lens that may provide decorative features to the hanger 10 and/or may cause light emitting from the light component 5 to reflect, refract, or otherwise be manipulated by the lens. Additionally, or alternatively, the light component 5 may include a plurality of lens. The lens or plurality of lens may comprise any suitable size and/or be any suitable shape.

In some embodiments, the light component 5 may be in communication with the processor. For example, the processor may receive one or more measurements from the sensor or sensors, as described. The processor may determine to illuminate, dim, and/or change the color of the light emitted from the light component 5 based on the measurements. For example, the processor may determine, based on the measurements that the humidity around the hanger 10 is above a threshold. The processor may send a signal to the light component 5 instructing the light component 5 change color to indicate that the humidity is above a threshold (e.g., to provide a visual indication that the humidity is greater than the threshold). It should be understood that the processor may instruct the light component 5 to illuminate, dim, terminate illumination, change color, or any other suitable function in response to any suitable measurement, such as a time measurement, a temperature measurement, a humidity measurement, an ambient light measurement, and the like. The processor may control emission of light from the light component 5 to indicate the various measurements and/or to provide illumination to the yoke 6 and/or the instrument (e.g., the guitar 13) in the yoke 6.

In some embodiments, the hanger 10 includes an access door 4 as is generally illustrated in FIG. 1. The access door 4 may provide access to the controller 3 and/or the light component 5. For example, the access door 4 may allow access to the processor and/or other components of the controller 3 and/or access to a light bulb or other components of the light component 5. In some embodiments, the hanger 10 includes a power source. The access door 4 may provide access to the power source.

The power source can include an alternating current power source (e.g., such as a wall adapter for an electrical outlet). The alternating current power source may include a connector configured to mate or engage with an input 7. The input 7 may include any suitable input configured to receive power from the alternating current power source. The input 7 may be in electrical communication with the controller 3, the digital display 42, the one or more sensors, and/or any other suitable electrical components of the hanger 10. The power received by the input 7 may be electrically communicated to the controller 3, the digital display 42, the one or more sensors, and/or any other suitable electrical components of the hanger 10 to provide electrical power.

In some embodiments, the power source may include a direct current power source such as a battery. The battery may be any suitable battery and may include a rechargeable battery. The input 7 may be configured to receive power from the alternating current power source, for example, to recharge the battery.

In some embodiments, the hanger 10 may include additional components or features. For example, the hanger 10 may include a communications device, such as a Wi-Fi radio, Bluetooth radio, other wireless radios, other near field commutation device, or a combination thereof. In some embodiments, the processor may communicate, via the communications device, measurements or other information to a computing device, such as a mobile computing device, a tablet-computing device, a laptop computing device, a desktop computing device, or other suitable computing device. For example, the processor may communicate a humidity value corresponding to the humidity proximate the hanger 10 to a mobile computing device. An application running on the mobile computing device may be configured to receive the measurements or other information from the processor. The application may be configured to display the measurements or other information. A user of the mobile device may adjust the humidifier and/or dehumidifier upon reading the measurements and/or information.

In some embodiments, the processor may communicate, via the communications device, the measurements, or other information to a smart device, such as a smart thermostat, which may be in communication with the humidifier and/or dehumidifier, or other suitable humidity control device. The smart thermostat may control the humidifier and/or dehumidifier, or other suitable humidity control device, to adjust the humidity proximate the hanger 10 based on the measurements or information communicated by the processor. In some embodiments, the processor may communicate directly with a smart humidifier and/or a smart dehumidifier, or other smart humidity control devices.

In some embodiments, the hanger 10 may include a voice command device configured to receive voice commands. For example, the process may receive voice commands from a user of the hanger 10 and may operate according to the voice commands. In some embodiments, some embodiments, the hanger 10 includes a speaker, which may be configured to broadcast an audible description of the measurements or information processed by the processor. It should be understood that the hanger 10 may include all of the components and/or features described herein, some of the components and/or features described herein, or additional features than the components and/or features described herein.

Figure 8:
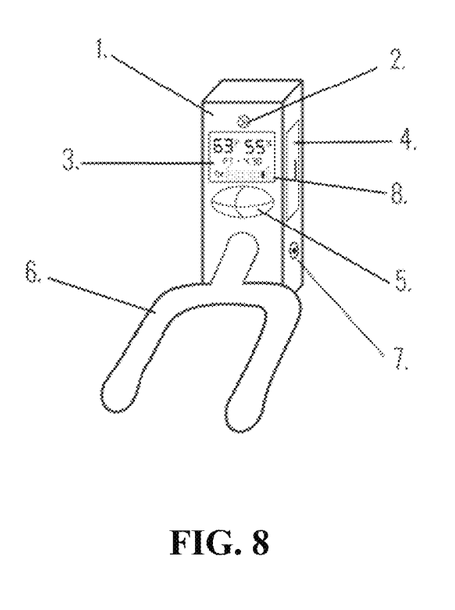
FIG. 8 generally illustrates an alternative wall mounted instrument hanger according to the principles of the present disclosure.

In some embodiments, the hanger 10 may include a tuning mechanism 8, as is generally illustrated in FIG. 8. The tuning mechanism 8 may include any suitable tuning mechanism 8, such as an instrument tuner. The tuning mechanism 8 may be configured to, for example, measure frequencies generated by or associated with an instrument. For example, the tuning mechanism 8 may be configured to measure frequencies generated by a vibrating string of a stringed instrument, such as a guitar. It should be understood that the tuning mechanism 8 may be configured to measure any suitable frequencies generated by any suitable instrument.

In some embodiment, the tuning mechanism 8 may be configured to compare measured frequencies with frequencies corresponding to notes on a scale. The tuning mechanism 8 may be configured to generate an output indicating a note closest to a measured frequency and/or an indication that the measured frequency is sharp or flat relative to the closest note corresponding to the frequency. The tuning mechanism 8 may be configured to provide the output to a display, such as the display 42 or another suitable display, such as a display dedicated to the tuning mechanism 8. The display dedicated to the tuning mechanism 8 may include a plurality of light emitting diodes configured to communicate the output generated by the tuning mechanism 8.

In some embodiments, the tuning mechanism 8 may be configured to receive frequencies from, for example, an instrument using a suitable input. The input may include a microphone disposed on a portion of the hanger 10 and configured to receive frequencies generated by the instrument. Additionally, or alternatively, the hanger 10 may include an instrument input, such as a one quarter inch input, a one eighth inch input, and the like. An instrument cable configured to mate with the instrument input may connect the instrument to the instrument input. The frequencies generated by the instrument may travel along wires of the instrument cable to the instrument input. The input associated with the tuning mechanism 8 may be configured to communicate received frequencies to the tuning mechanism 8.

In some embodiments, the tuning mechanism 8 may be in communication with the controller 3. For example, the tuning mechanism 8 may receive frequencies from the controller 3 and/or provide generated output to the controller 3. The controller 3 may be in communication with the display 42 and/or the display dedicated to the tuning mechanism 8 for providing the output. Additionally, or alternatively, the controller 3 may receive frequencies from the input associated with the tuning mechanism 8 and may provide the frequencies to the tuning mechanism 8. In some embodiments, the tuning mechanism 8 may be embodied in the controller 3.

In some embodiments, the controller 3 may perform the methods described herein. However, the methods described herein as performed by controller 3 are not meant to be limiting, and any type of software executed on a controller can perform the methods described herein without departing from the scope of this disclosure. For example, a controller, such as a processor executing software within a computing device, can perform the methods described herein.

Figure 7:
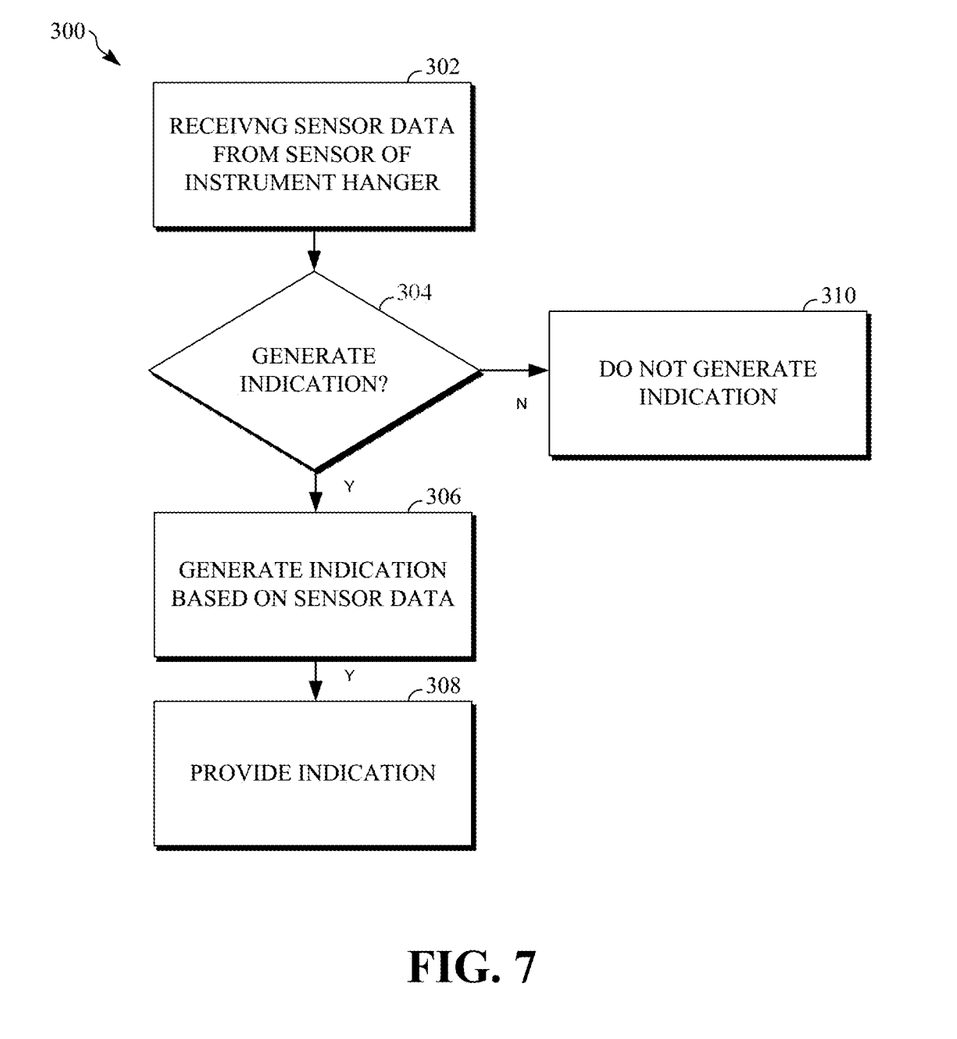
FIG. 7 is a flow diagram generally illustrating a method according to the principles of the present disclosure.

FIG. 7 is a flow diagram generally illustrating a method 300 according to the principles of the present disclosure. At 302, the method 300 receives sensor data from a sensor of an instrument hanger. For example, the controller 3 may receive sensor data from one or more sensors disposed on the hanger 10. In some embodiments, the sensors may be disposed on the yoke 6 or in any suitable location on the wall mount 1. In some embodiments, the controller 3 may be in communication, via a communication device as described, one or more sensors remotely located from the hanger 10. For example, the controller 3 may receive sensor data from sensors disposed on mobile computing devices, such as smart phones, tablets, and the like.

At 304, the method 300 determines whether to generate the indication. For example, the controller 3 may receive the sensor data and determine whether a measurement associated with the sensor data is above a threshold. For example, the controller 3 may receive a humidity measurement. The controller 3 may compare the humidity measurement to a threshold. The controller 3 may determine to generate the indication in response to the humidity measurement being greater than the threshold. In some embodiments, the controller 3 may determine whether to generate a first indication while generating second indication. For example, as described the controller 3 may provide an indication of measurements associated with the sensor data to the digital display 42. Simultaneously or substantially simultaneously, the controller 3 may determine whether to generate an indication using the light component 5. For example, if the controller 3 determines the humidity measurement is greater than the threshold, the controller 3 may increase an intensity of the light component 5, change the color of the light component 5, or control the light component in any suitable manner (e.g., the controller 3 may always output the value associated with the measurement to the digital display and may also control the light component in response to a comparison of the measurement to corresponding threshold).

If the controller 3 determines not to generate the indication, the method 300 continues at 310. If the controller 3 determines to generate the indication, the method 300 continue at 306. At 306, the method 300 generates the indication based on the sensor data. For example, the controller 3 generates the indication as described.

At 308, the method 300 provides the indication. For example, the controller 3 may provide the indication using the digital display 42, the light component 5, and suitable other indication mechanism, or a combination thereof. In some embodiments, the controller 3 may in communication with one or more computing devices, such as a mobile computing device, a desktop computing device, a laptop-computing device, a dedicated computing device, a remotely located cloud computing device, any other computing device, or a combination thereof. The controller 3 may communicate a signal to the computing device indicating the indication.

At 310, the method 300 does not generate the indication. For example, the controller 3 does not indicate at least one indication. For example, the controller 3 may not control features of the light component 5, which still displaying another indication on the digital display. It should be understood that the controller 3 may control features of the light components based either on sensor data or in response to a signal received from a switch initiating the light component 5.

In some embodiments, an apparatus for hanging an instrument includes a wall mount adapted to secure the apparatus to mountable surface and a yoke adapted engage a bore extending through the wall mount, the yoke being adapted to receive at least a portion of an instrument. The apparatus also includes an axial arm that extends from the yoke and is configured to secure the yoke to the wall mount and at least one sensor disposed on the wall mount configured to measure at least one characteristic. The apparatus also includes a controller configured to: receive at least one measurement indicating the at least one characteristic from the at least one sensor; generate at least one indication based on the at least one measurement; and display, at a digital display disposed on a surface of the wall mount opposite the mountable surface.

In some embodiments, the apparatus also includes at least one light component, wherein the controller is further configured to selectively control illumination of a light component based on the at least one measurement. In some embodiments, the light component is disposed on the surface of the wall mount opposite the mountable surface. In some embodiments, the light component is disposed on the surface of the wall mount opposite the mountable surface above the yoke. In some embodiments, the light component is adapted to emit light in a direction of the yoke. In some embodiments, the at least one indication indicates a humidity value corresponding to an environment of the wall mount. In some embodiments, the at least one indication indicates an ambient temperature corresponding to an environment of the wall mount. In some embodiments, the at least one indication indicates a current time. In some embodiments, the axial arm includes one or more threads. In some embodiments, the axial arm is configured to engage one or more corresponding threads of the bore extending into the wall mount.

In some embodiments, a system includes a processor and a memory. The memory includes instructions that, when executed by the processor, cause the processor to: receive sensor data from a sensor of an instrument hanger; determine whether to generate at least one indication based on the sensor data; in response to a determination to generate the at least one indication, generate the at least one indication based on the sensor data; and provide the at least one indication.

In some embodiments, the instructions further cause the processor to selectively control illumination of a light component based sensor. In some embodiments, the light component is disposed on a surface of the instrument hanger. In some embodiments, the light component is disposed on a surface of the instrument hanger opposite a mountable surface above a yoke. In some embodiments, the light component is adapted to emit light in a direction of the yoke. In some embodiments, the at least one indication indicates a humidity value corresponding to an environment of the instrument hanger. In some embodiments, the at least one indication indicates an ambient temperature corresponding to an environment of the instrument. In some embodiments, the at least one indication indicates a current time. In some embodiments, the instructions further cause the processor to provide the at least one indication by displaying the at least one indication on a digital display of the instrument hanger.

In some embodiments, a method includes receiving sensor data from a sensor of an instrument hanger and determining whether to generate at least one indication based on the sensor data. The method also includes, in response to a determination to generate the at least one indication, generating the at least one indication based on the sensor data. The method also includes providing the at least one indication.

In some embodiments, an apparatus for hanging an instrument includes a wall mount adapted to secure the apparatus to mountable surface. The apparatus also includes a yoke adapted engage a bore extending through the wall mount, the yoke being adapted to receive at least a portion of an instrument and an axial arm that extends from the yoke and is configured to secure the yoke to the wall mount. The apparatus also includes at least one sensor disposed on the wall mount configured to measure at least one characteristic and a tuning mechanism configured to measure at least one frequency and to output, to a display, an indication of the at least one measured frequency.

In some embodiments, the apparatus also includes a controller configured to: receive at least one measurement indicating the at least one characteristic from the at least one sensor; generate at least one indication based on the at least one measurement; and display, at a digital display disposed on a surface of the wall mount opposite the mountable surface. In some embodiments, the apparatus also includes at least one light component, wherein the controller is further configured to selectively control illumination of a light component based on the at least one measurement. In some embodiments, light component is disposed on the surface of the wall mount opposite the mountable surface. In some embodiments, the light component is disposed on the surface of the wall mount opposite the mountable surface above the yoke. In some embodiments, the light component is adapted to emit light in a direction of the yoke. In some embodiments, the at least one indication indicates a humidity value corresponding to an environment of the wall mount. In some embodiments, the at least one indication indicates an ambient temperature corresponding to an environment of the wall mount. In some embodiments, the at least one indication indicates a current time. In some embodiments, the axial arm includes one or more threads. In some embodiments, the axial arm is configured to engage one or more corresponding threads of the bore extending into the wall mount.

In some embodiments, a system includes a processor and a memory. The memory includes instructions that, when executed by the processor, cause the processor to: receive sensor data from a sensor of an instrument hanger; determine whether to generate at least one indication based on the sensor data; receive at least one frequency generated by an instrument; communicate the at least one frequency to a tuning mechanism; receive, from the tuning mechanism, an output including an indication of the at least one frequency and an indication of a sharpness or flatness of the at least one frequency; in response to a determination to generate the at least one indication, generate the at least one indication based on the sensor data; and provide, for display, the at least one indication and the output indication.

In some embodiments, the instructions further cause the processor to selectively control illumination of a light component based senor. In some embodiments, the light component is disposed on a surface of the instrument hanger. In some embodiments, the light component is disposed on a surface of the instrument hanger opposite a mountable surface above a yoke. In some embodiments, the light component is adapted to emit light in a direction of the yoke. In some embodiments, the at least one indication indicates a humidity value corresponding to an environment of the instrument hanger. In some embodiments, the at least one indication indicates an ambient temperature corresponding to an environment of the instrument. In some embodiments, the at least one indication indicates a current time.

In some embodiments, a method receiving sensor data from a sensor of an instrument hanger and determining whether to generate at least one indication based on the sensor data. The method also includes receiving at least one frequency generated by an instrument and communicating the at least one frequency to a tuning mechanism. The method also includes receiving, from the tuning mechanism, an output including an indication of the at least one frequency and an indication of a sharpness or flatness of the at least one frequency and, in response to a determination to generate the at least one indication, generating the at least one indication based on the sensor data. The method also includes providing, for display, the at least one indication and the output indication.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. An apparatus for hanging an instrument, the apparatus comprising:
    a wall mount adapted to secure the apparatus to mountable surface;
    a yoke adapted engage a bore extending through the wall mount, the yoke being adapted to receive at least a portion of an instrument;
    an axial arm that extends from the yoke and is configured to secure the yoke to the wall mount;
    at least one sensor disposed on the wall mount configured to measure at least one characteristic; and
    a tuning mechanism configured to measure at least one frequency and to output, to a display, an indication of the at least one measured frequency.

2. The apparatus of claim 1, further comprising a controller configured to:
    receive at least one measurement indicating the at least one characteristic from the at least one sensor;
    generate at least one indication based on the at least one measurement; and
    display, at a digital display disposed on a surface of the wall mount opposite the mountable surface.

3. The apparatus of claim 2, further comprising at least one light component, wherein the controller is further configured to selectively control illumination of a light component based on the at least one measurement.

4. The apparatus of claim 3, wherein the light component is disposed on the surface of the wall mount opposite the mountable surface.

5. The apparatus of claim 3, wherein the light component is disposed on the surface of the wall mount opposite the mountable surface above the yoke.

6. The apparatus of claim 3, wherein the light component is adapted to emit light in a direction of the yoke.

7. The apparatus of claim 2, wherein the at least one indication indicates a humidity value corresponding to an environment of the wall mount.

8. The apparatus of claim 2, wherein the at least one indication indicates an ambient temperature corresponding to an environment of the wall mount.

9. The apparatus of claim 2, wherein the at least one indication indicates a current time.

10. The apparatus of claim 2, wherein the axial arm includes one or more threads.

11. The apparatus of claim 10, wherein the axial arm is configured to engage one or more corresponding threads of the bore extending into the wall mount.

12. A system comprising:
    a processor; and
    a memory including instructions that, when executed by the processor, cause the processor to:
        receive sensor data from a sensor of an instrument hanger;
        determine whether to generate at least one indication based on the sensor data;
        receive at least one frequency generated by an instrument;
        communicate the at least one frequency to a tuning mechanism;
        receive, from the tuning mechanism, an output including an indication of the at least one frequency and an indication of a sharpness or flatness of the at least one frequency;
        in response to a determination to generate the at least one indication, generate the at least one indication based on the sensor data; and
        provide, for display, the at least one indication and the output indication.

13. The system of claim 12, wherein the instructions further cause the processor to selectively control illumination of a light component based sensor.

14. The system of claim 13, wherein the light component is disposed on a surface of the instrument hanger.

15. The system of claim 13, wherein the light component is disposed on a surface of the instrument hanger opposite a mountable surface above a yoke.

16. The system of claim 15, wherein the light component is adapted to emit light in a direction of the yoke.

17. The system of claim 12, wherein the at least one indication indicates a humidity value corresponding to an environment of the instrument hanger.

18. The system of claim 12, wherein the at least one indication indicates an ambient temperature corresponding to an environment of the instrument.

19. The system of claim 12, wherein the at least one indication indicates a current time.

20. A method for generating a tuning indication for an instrument, the method comprising:
- receiving sensor data from a sensor of an instrument hanger;
- determining whether to generate at least one indication based on the sensor data;
- receiving at least one frequency generated by an instrument;
- communicating the at least one frequency to a tuning mechanism;
- receiving, from the tuning mechanism, an output including an indication of the at least one frequency and an indication of a sharpness or flatness of the at least one frequency;
- in response to a determination to generate the at least one indication, generating the at least one indication based on the sensor data; and
- providing, for display, the at least one indication and the output indication.

\* \* \* \* \*